United States Patent [19]
Takegahara et al.

[11] Patent Number: 5,595,463
[45] Date of Patent: Jan. 21, 1997

[54] AREA MACHINING METHOD

[75] Inventors: Takashi Takegahara, Hachioji; Shigetoshi Takagi; Shinya Nakamura, both of Yamanashi, all of Japan

[73] Assignee: Fanuc Ltd., Japan

[21] Appl. No.: 490,592

[22] Filed: Jun. 15, 1995

[30]  Foreign Application Priority Data

Jul. 1, 1994 [JP] Japan ..................... 6-150848

[51] Int. Cl.$^6$ .......................... B23C 3/00; G05B 19/4061
[52] U.S. Cl. .................. 409/132; 318/570; 364/474.35; 409/80
[58] Field of Search .............................. 409/80, 79, 131, 409/132; 318/570, 560.1; 364/474.29, 474.32, 474.33, 474.34, 474.35, 474.18

[56]  References Cited

U.S. PATENT DOCUMENTS

| | | | |
|---|---|---|---|
| 4,926,338 | 5/1990 | Nankaku | 364/474.18 |
| 5,526,272 | 6/1996 | Kondo et al. | 364/474.22 |

FOREIGN PATENT DOCUMENTS

| | | | |
|---|---|---|---|
| 2651340 | 3/1991 | France | 409/80 |
| 1646714 | 5/1991 | U.S.S.R. | 409/80 |

*Primary Examiner*—William Briggs
*Attorney, Agent, or Firm*—Staas & Halsey

[57] ABSTRACT

An area machining method for efficiently hollowing out an area which contains a part of an outline of a workpiece is disclosed. An outward offset line is set outside the workpiece with a predetermined offset distance. Then a series of offset contours (i.e., the elements of the tool path) are defined within the region between the outward offset line and the final part contour. Since the offset distance to the outward offset line is set zero, all the offset contours share a segment of the outward offset line. Except for this common segment, the offset contours are given a cutting feedrate.

4 Claims, 9 Drawing Sheets

```
AREA, name
  BLK, S1
  C2, CW
  S2
   .
   .
   .
AEND
```
P

FIG. 5

AREA MACHINING METHOD

BACKGROUND OF THE INVENTION

1. Field of the Invention

The present invention relates to an area machining method, and more specifically, to an area machining method for hollowing out an area whose boundary is partially open.

2. Description of the Related Art

Area machining is a type of machining that hollows out an area arbitrarily defined on a surface of a workpiece, thereby forming a pocket. Part programs for the area machining are obtained by using an automatic programming system or a CAD/CAM (Computer Aided Design/Computer Aided Manufacturing) system. For example, when using an automatic programming system to create a tool path to hollow out a specific area, it is necessary to specify the final shape of the area to be cut and finished as well as the cutting conditions. The cutting conditions typically include such data as tool radius, cutting feedrate, depth of cut, and finishing allowance. The depth of cut and the finishing allowance should be defined in both radial and axial (i.e., Z-axis) directions.

Conventional area machining methods assume that they will finally produce a continuous wall along the boundary of the area, and the machined area (or pocket) will be "closed" by the wall.

Actually, however, it is often required to machine an area that is not closed by a wall unlike the one described above. In other words, a part of the pocket produced by the machining is open on a side of the workpiece. In this sense, this kind of area is to be called a "partially open area" in this description. The conventional area machining methods have been applied also to this partially open area, although they were originally developed for the aforementioned closed area.

FIG. 8 is a diagram showing a conventional area machining method for hollowing out a partially open area. The reference numeral 1 indicates a workpiece, and 2-1, 2-2 and 2-3 represent the boundary that specifies the area. The machine tool will hollow out the inside of the area bounded by those three line segments and a line segment 2-4 which is a part of the workpiece outline.

In reality, however, the conventional methods request to define the area as indicated by a broken line 3 instead of the line segment 2-4. That is, the area should be defined as if it hanged out of the workpiece 1. This is for the reason that, in every cutting cycle of the area machining operation, the tool should be once moved out of the workpiece not to leave any part unmachined.

Based on the contour of the area defined by the lines 2-1, 2-2, 2-3 and 3, the automatic programming system generates a cyclic tool path to enlarge the open pocket by repetitively feeding the tool by a constant depth of cut from inside to outside. In FIG. 8, narrow lines 4-1, 4-2 and 4-3 indicate the offset contours, which are generated from the contour of the area, each offset contour having a different offset distance therefrom. The complete tool path will be created by connecting those offset contours in the order of 4-3, 4-2 and then 4-1 (i.e., from inside to outside).

FIG. 9 shows another example of the conventional machining method for hollowing out a partially open area. The figure illustrates a rectangular solid workpiece 1, one of whose corners will be machined as indicated by lines 2-1 and 2-2.

In this case, a contour machining method is used for generating a tool path by the following simple steps. First, offset contours 4-1, 4-2 and 4-3 are created by repeating an outward displacement of the target contour defined by the lines 2-1 and 2-2. Next, the tool path is created by connecting those offset contours so that the tool will proceed in zigzag along the offset contours toward the target contour (i.e., from 4-3 to 4-2 and then 4-1).

However, according to those conventional methods of area machining, a substantial portion of the generated tool path will run in the space where no workpiece exists. As a result, the tool will continue cutting "air" at a constant cutting feedrate even though it has already left the workpiece.

Further, the depth setting motion in each cycle is done also at this low feedrate. Although the tool could traverse to the next starting position at a higher speed, it must move at a low cutting feedrate in the conventional area machining. This so-called "air cut" operation makes the total machining time longer, thus degrading the productivity of area machining.

SUMMARY OF THE INVENTION

Taking the above into consideration, an object of the present invention is to provide an area machining method, whereby a partially open area can be machined with efficiency.

To accomplish the above object, according to the present invention, there is provided an area machining method for hollowing out an area whose boundary is partially open.

The method starts with defining a shape and cutting conditions of an area to be machined. The shape of the area is defined by a workpiece contour and a final part contour. The former is a part of the workpiece outline and the latter is a finished contour expected to be obtained as a result of the area machining.

The method then defines an outward offset line so that it is set away from the workpiece contour with a predetermined offset distance.

The method next generates a series of offset contours. The offset contours are defined within a region surrounded by the final part contour and the outward offset line, and each of them has a predetermined and stepwise offset distance only from the final part contour.

The method further generates a tool path by connecting the offset contours.

The method lastly sets a tool speed to each part of the tool path. A cutting feedrate is set to the offset contours except for the common segment with the outward offset line and a rapid traverse speed or a predetermined speed is set to the outward offset line.

According to the above-described method, the outward offset line is set outside the workpiece contour with a predetermined offset distance. And a series of offset contours (i.e., the elements of the tool path) are defined in the region between the outward offset line and the final part contour. Since the offset distance to the outward offset line is set zero, all the offset contours share a segment of the outward offset line. Except for this common segment, the offset contours are given a cutting feedrate.

The above and other objects, features and advantages of the present invention will become apparent from the following description when taken in conjunction with the accompanying drawings which illustrate a preferred embodiment of the present invention by way of example.

BRIEF DESCRIPTION OF THE DRAWINGS

FIG. 5 is a diagram showing an example of a method for specifying a workpiece contour;

DESCRIPTION OF THE PREFERRED EMBODIMENT

An embodiment of the present invention will be described below with reference to the drawings.

Figure 1:
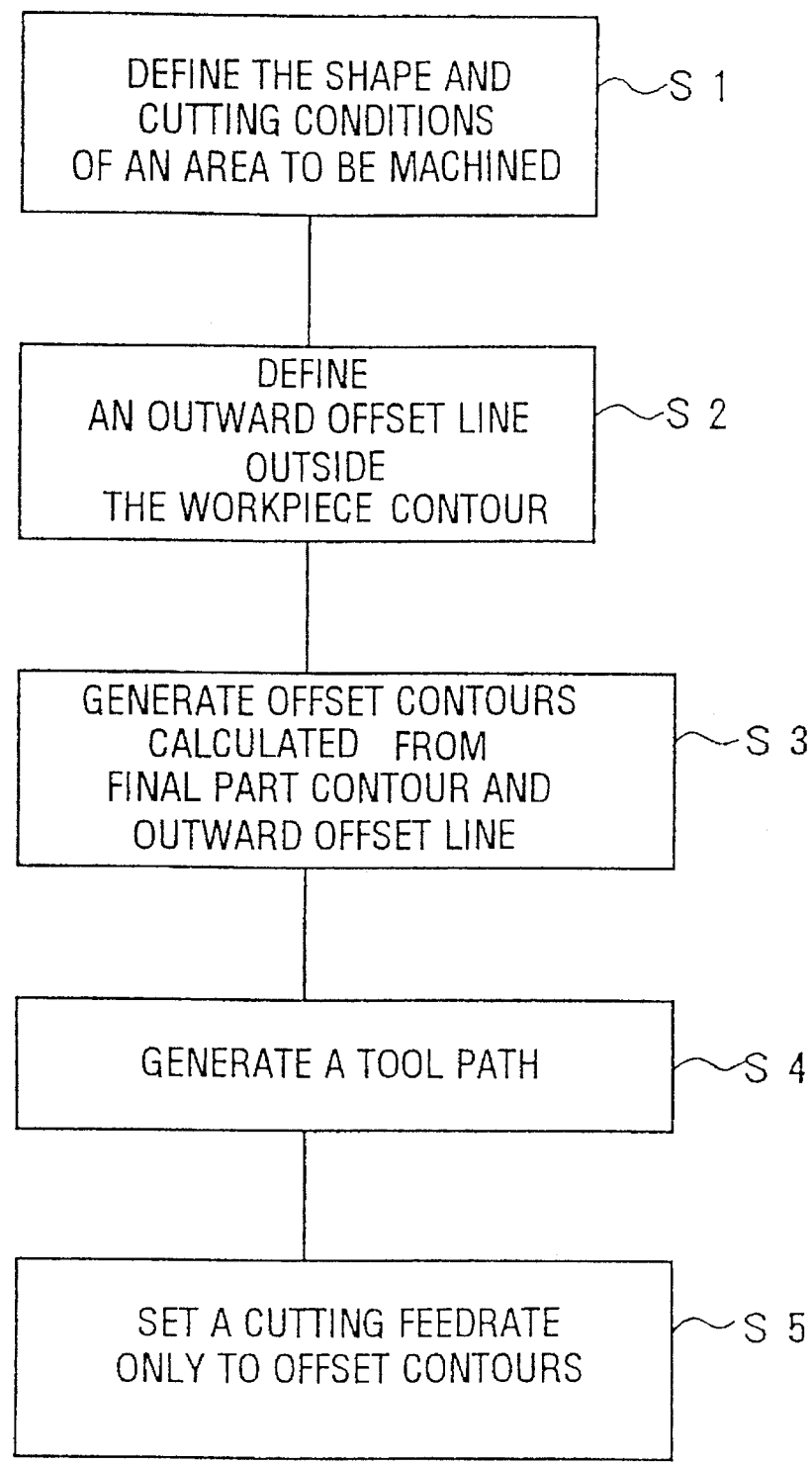
FIG. 1 is a flowchart showing an area machining method of the present invention.

FIG. 1 is a flowchart showing an area machining method of the present invention. More specifically, FIG. 1 explains a method by which an automatic programming system generates a tool path for the area machining.

First, the method starts with defining a shape of an area to be machined and setting the machining conditions (Step S1). The shape of a partially open area is defined by specifying two lines which bound the area. One is a finished profile of the area, which will be called a "final part contour" in this description. Another is a part of the workpiece outline, at which part the area is open. The contour of that part is herein called a "workpiece contour." Both the final part contour and the workpiece contour should be defined in this step S1. The cutting conditions include a tool radius, a depth of cut, a finishing allowance, and a cutting feedrate.

Secondly, an outward offset line is defined (Step S2). The outward offset line is a line set outward in parallel with the workpiece contour with a certain offset distance. The offset distance is predetermined so that the tool will never contact with the workpiece when it is located on the outward offset line.

Thirdly, offset contours are defined by calculation from the outward offset line and the final part contour (Step S3). The offset contours are calculated step by step in the following manner. A region between the final part contour and the outward offset line is subjected to the calculation. Then a first contour inside the region is calculated so that the contour will have a constant offset from the outline of the region. While the offset distance from the final part contour equals to the tool radius plus the finishing allowance, that from the outward offset line is zero. The next offset contour will be drawn within the first offset contour. The offset distance from the final part contour is now increased by a depth of cut, however, that from the outward offset line is always zero. In this way, the offset contours will be obtained until they fill the region.

Fourthly, a tool path is generated by connecting the offset contours (Step S4). That is, the offset contours obtained in the step S3 are concatenated one after another, thus generating a cyclic tool path. Note that all the offset contours share a segment of the outward offset line because of the nature of the above-described algorithm.

Lastly, a tool speed is set to each part of the tool path. To be more specific, a cutting feedrate command is set to the offset contours except for the common segment with the outward offset line, to which a rapid traverse speed or other preset speed is set (Step S5). This smart feedrate setting enables the tool to move at the cutting feedrate while it is really cutting into the workpiece, and to run at a higher speed when it finished cutting in a cycle and traverses to the starting position of the next cycle.

Figure 2:
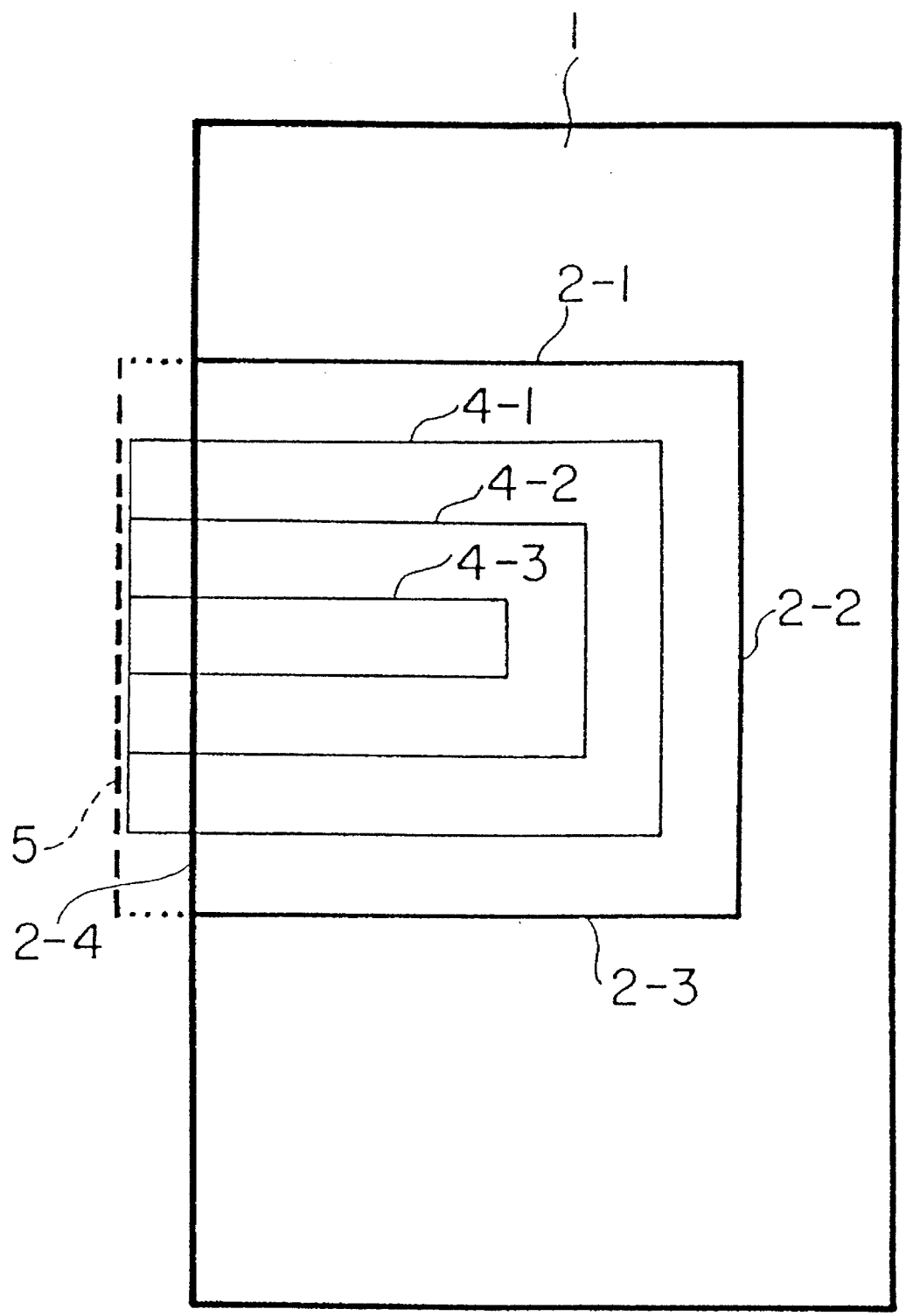
FIG. 2 is a diagram showing an example of an outside offset line definition.

FIG. 2 is a diagram showing an example of an outward offset line definition. The diagram exemplifies an area machining that hollows out an area bounded by four straight lines, one of which is a part of the outline of the workpiece 1, thus forming a partially open area as described in the beginning of this specification.

The reference codes 2-1, 2-2 and 2-3 in FIG. 2 indicate the line elements that form the final part contour. Another line element 2-4 is the workpiece contour, which is a part of the outline of the workpiece 1.

An outward offset line 5 is set outside the workpiece 1 with a certain offset distance. The offset distance must be at least the tool radius so that the tool (not shown) will not contact with the workpiece 1 when it is located on the outward offset line 5.

Then a first offset contour 4-1 is obtained by taking a predetermined constant offset from the final part contour composed of the line segments 2-1, 2-2 and 2-3. The distance between the first offset contour 4-1 and the final part contour equals to the tool radius plus the finishing allowance. The offset contour 4-1 overlaps the outward offset line 5 since the offset thereto is set to zero in the calculation of the offset contour.

The next offset contour 4-2 is obtained inside the first offset contour 4-1 by increasing the offset distance from the final part contour by a depth of cut. Note that the offset distance from the outward offset line 5 is still zero.

In the same manner, further offset contours 4-3, 4-4 ... 4-n (n is a number of the final offset contour) will be obtained. In this example, however, the offset contour 4-3 is the final one. The area machining will start from this most inner contour and the cutting start position is determined to either end of an element of the offset contour 4-3 overlapping the outward offset line 5.

Figure 3:
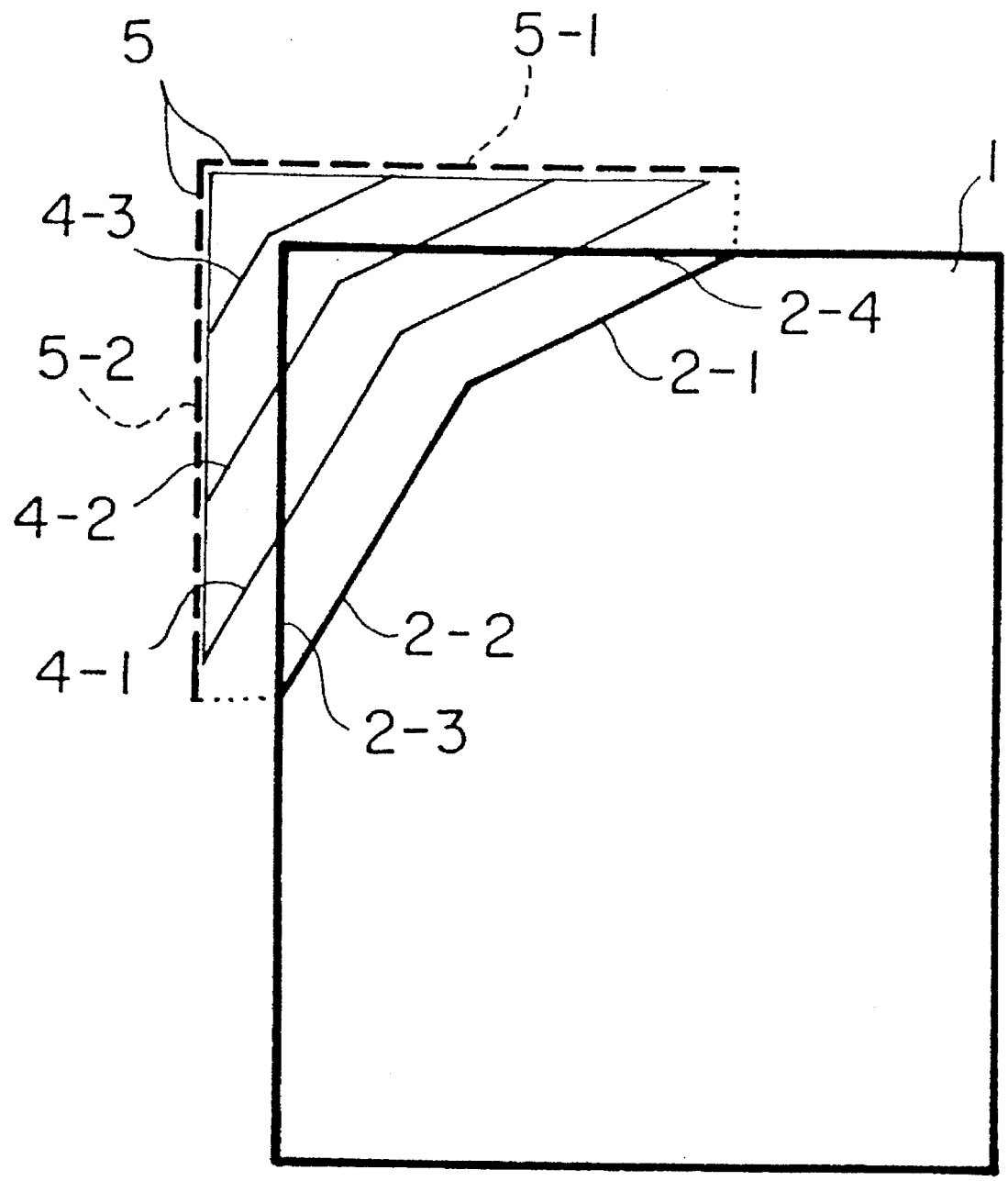
FIG. 3 is a diagram showing another example of an outside offset line definition.

FIG. 3 is a diagram showing another example of an outward offset line definition. The diagram exemplifies an area machining that hollows out an area surrounded by four straight lines, two of which are of a part of the outline of a rectangular solid workpiece 1, thus forming a partially open area.

Line segments 2-1 and 2-2 in FIG. 3 are the line elements of the final part contour. Other line segments 2-3 and 2-4 are the elements of the workpiece contour which denotes a part of the workpiece outline.

An outward offset line 5 is then set outside the workpiece with a certain offset distance. The offset distance must be at least the tool radius so that the tool (not shown) will not contact with the workpiece 1 when it is located on the outward offset line 5. The line segments 5-1 and 5-2 are elements of the outward offset line 5 corresponding to the workpiece contours 2-3 and 2-4, respectively.

Then a first offset contour 4-1 is obtained by taking a predetermined constant offset from the final part contour composed of the line segments 2-1 and 2-2. The predetermined distance between the final part contour and the first offset contour 4-1 is set, for example, equal to the tool radius plus the finishing allowance. The offset contour 4-1 overlaps the outward offset line 5 since the offset thereto is set to zero in the calculation of the offset contour.

The next offset contour 4-2 is obtained within the first offset contour 4-1 by increasing the offset distance from the final part contour by a depth of cut. Note that the offset distance from the outward offset line 5 is still zero.

In the same manner, further offset contours 4-3, 4-4 . . . 4-n (n is a number of the final offset contour) can be obtained. In this example, the offset contour 4-3 is the final offset contour and the area machining will start therefrom. The cutting start position is set to either end of the element overlapping the outward offset line 5.

Figure 4:
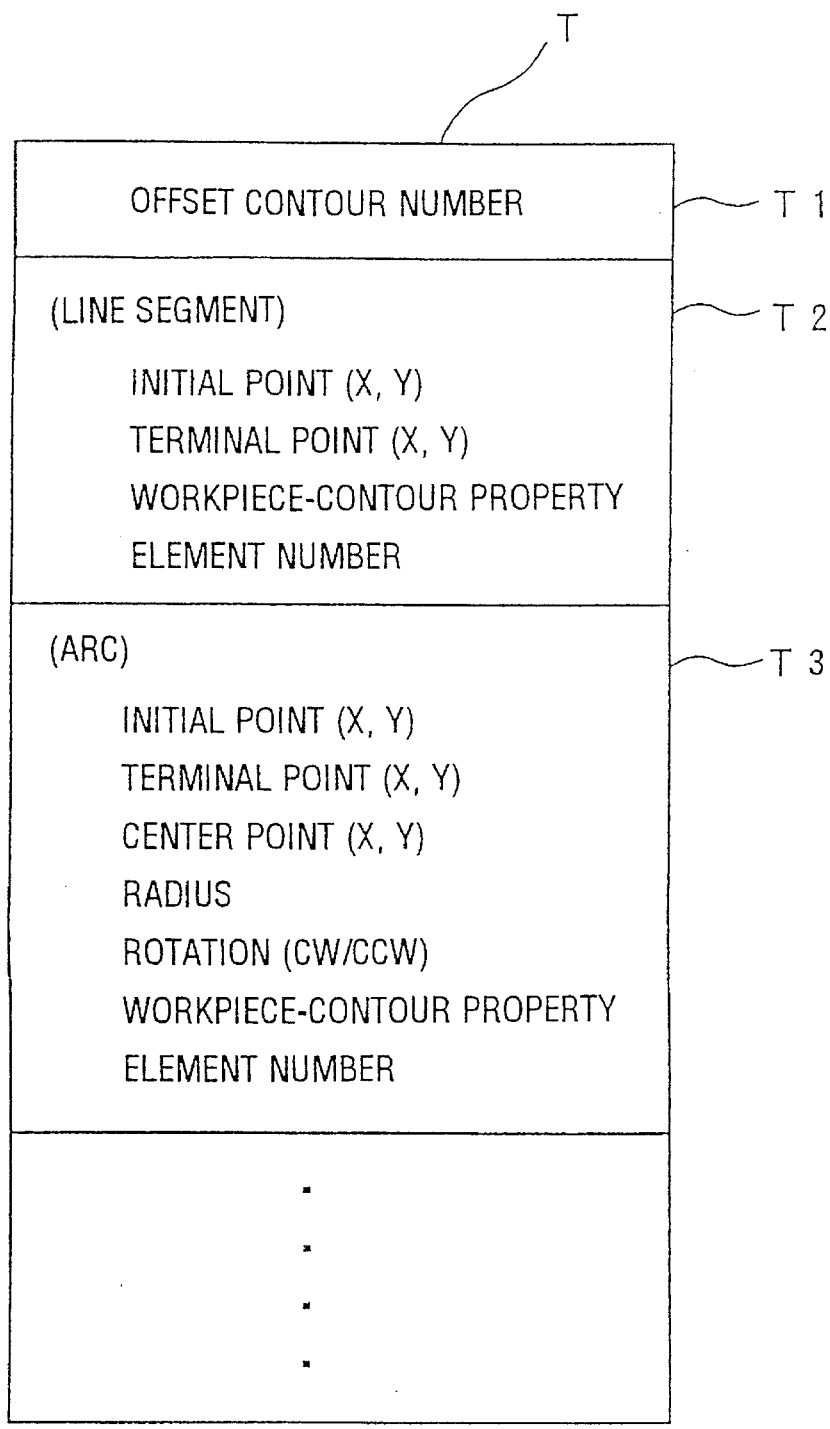
FIG. 4 is a diagram showing an example of an offset contour table which contains contour data.

FIG. 4 is a diagram showing an example of an offset contour table which contains contour elements. The elements of an offset contour include line segments and arcs, and they are stored in the offset contour table T in a database of a CAD/CAM system or an automatic programming system.

The offset contour table is constructed by entries for a plurality of offset contours and the structure of each entry is defined as follows. An entry representing an offset contour starts with an offset contour number T1, which indicates the numerical order of the offset contour, and data of the contour elements follow the number T1.

When the element is a line segment, a set of line segment data will be stored in the table. The line segment data set T2 consists of coordinates of its initial point and terminal point, a flag to indicate whether the line segment is derived from the workpiece contour or not (i.e., a workpiece-contour property flag), and an element number to indicate a numerical order of the element.

When the element is an arc, a set of arc data will be stored in the table. The arc data set T3 consists of coordinates of its initial point, terminal point and center point, its radius, a direction CW (clockwise) or CCW (counterclockwise), a workpiece-contour property flag, and an element number.

In the case of a CAD/CAM system is used, the shape of a workpiece and related contours will be displayed on the screen. So the operator can pick, by manual, the workpiece contour of the area to be hollowed out. By specifying the workpiece contour on the screen, the workpiece-contour property flag will be automatically set to the corresponding line segment data set or arc data set in the offset contour table T stored in the database of the CAD/CAM system.

In the case of using a programming language like FAPT, which is running on an automatic programming system, to generate an area machining program, the operator can specify a workpiece contour in the FAPT statements which define the shape of the area. How to specify the workpiece contour in the FAPT language will be next described.

Figure 5:
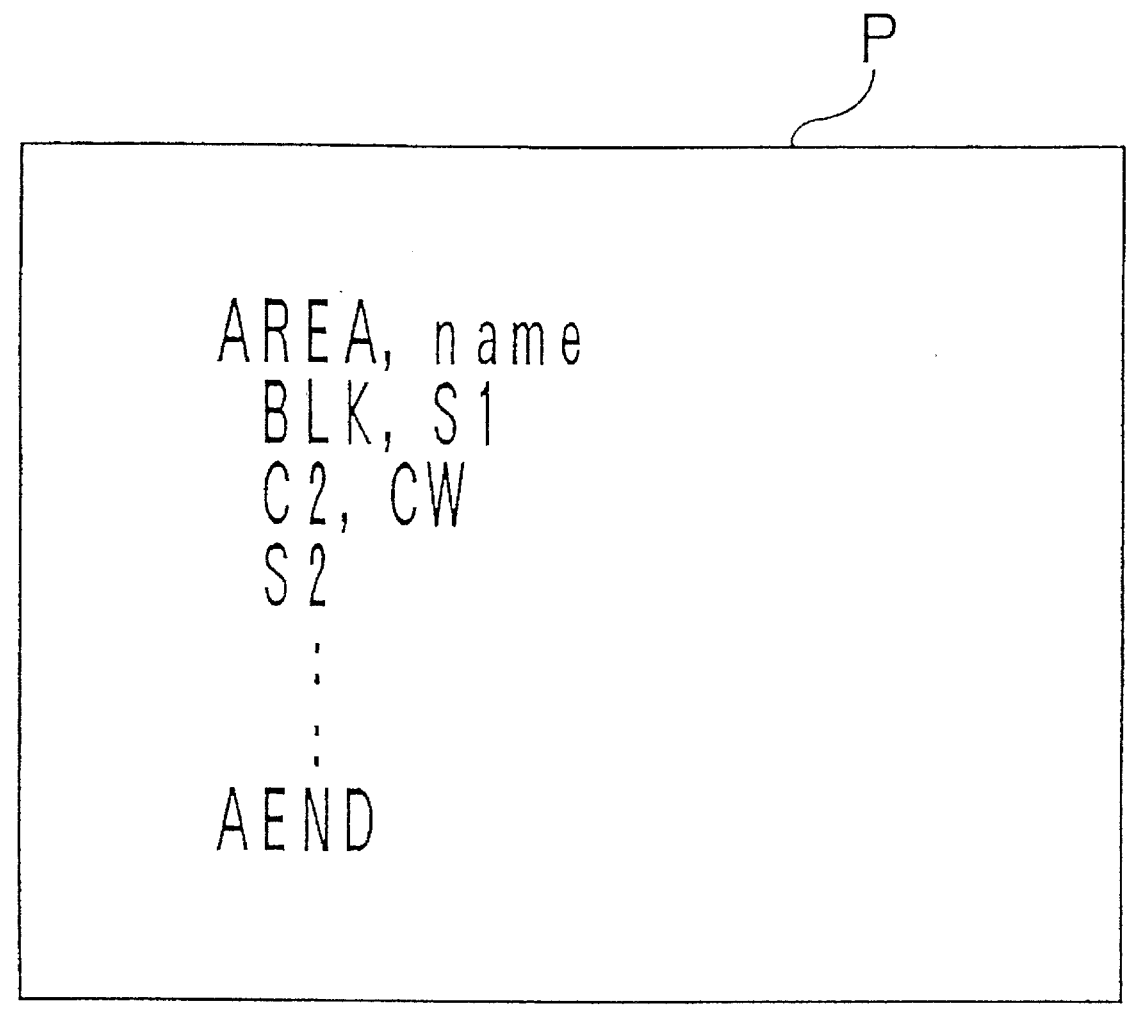

FIG. 5 is a diagram showing an example of a method for specifying a workpiece contour. FIG. 5 represents a program list of the FAPT language which defines a shape of the area to be hollowed out in an area machining program P.

An "AREA" statement is first shown in FIG. 5 and an appropriate name follows it in the "name" field. Next, the contour elements are defined as: a line segment "S1," an arc "C2, CW," a line segment "S2" and so on. The area definition is now terminated by an "AEND" statement.

As shown in the line segment definition "S1," it is possible to add a keyword "BLK" designating a property of workpiece contour directly to the workpiece contour of the area. The keyword "BLK" is not specified in other elements as consistent as the traditional FAPT language syntax.

The automatic programming system will parse this program and create an offset contour table in a database. In the offset contour table T, the contour elements to be derived from the line segment "BLK, S1" will have a workpiece-contour property flag.

Figure 6:
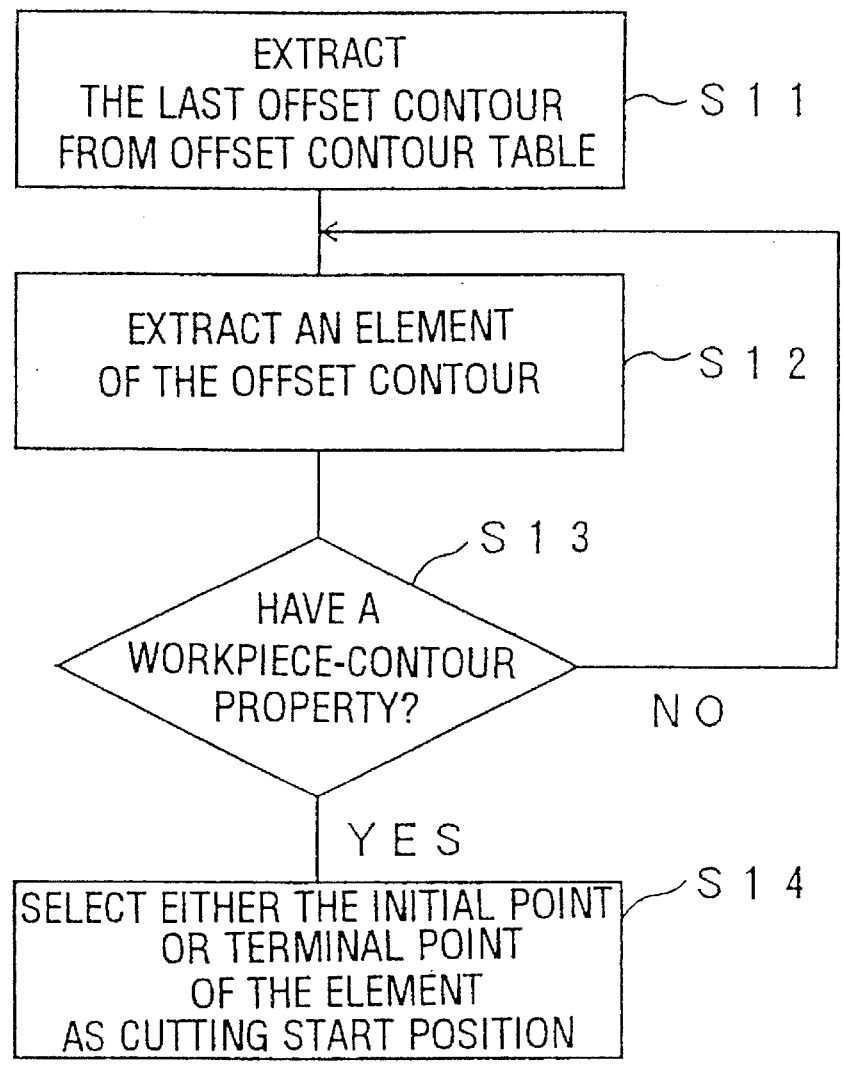
FIG. 6 is a flowchart showing a method for setting a cutting start position in an area machining method.

FIG. 6 is a flowchart showing a method for setting a cutting start position in the area machining method of the present invention. The following will describe how to determine a cutting start position automatically.

First, the last entry is extracted from the offset contour table (Step S11). The offset contour defined in the extracted entry is the one located farthest from the final part contour (i.e., the most inner offset contour) among the series of offset contours.

Secondly, an element of the last offset contour is picked up (Step 12). The offset contour actually consists of several line segments and arcs. The Step 12 selects one of those elements.

Thirdly, the selected element is examined whether it has a workpiece-contour property or not (Step 13). If not, it returns to Step 12 and next element will be picked up. If yes, it proceeds to the next step.

Lastly, either the initial point or terminal point of the element that has a workpiece-contour property is determined as the cutting start position (Step 14).

The cutting start position determined by the above-described method is always on the outward offset line which is previously defined at a proper distance from the workpiece. Therefore, the first Z-axis (i.e., the axial direction of the tool) motion to set a Z-axis depth of cut at the cutting start position will be done without causing any stress to the tool.

Figure 7:
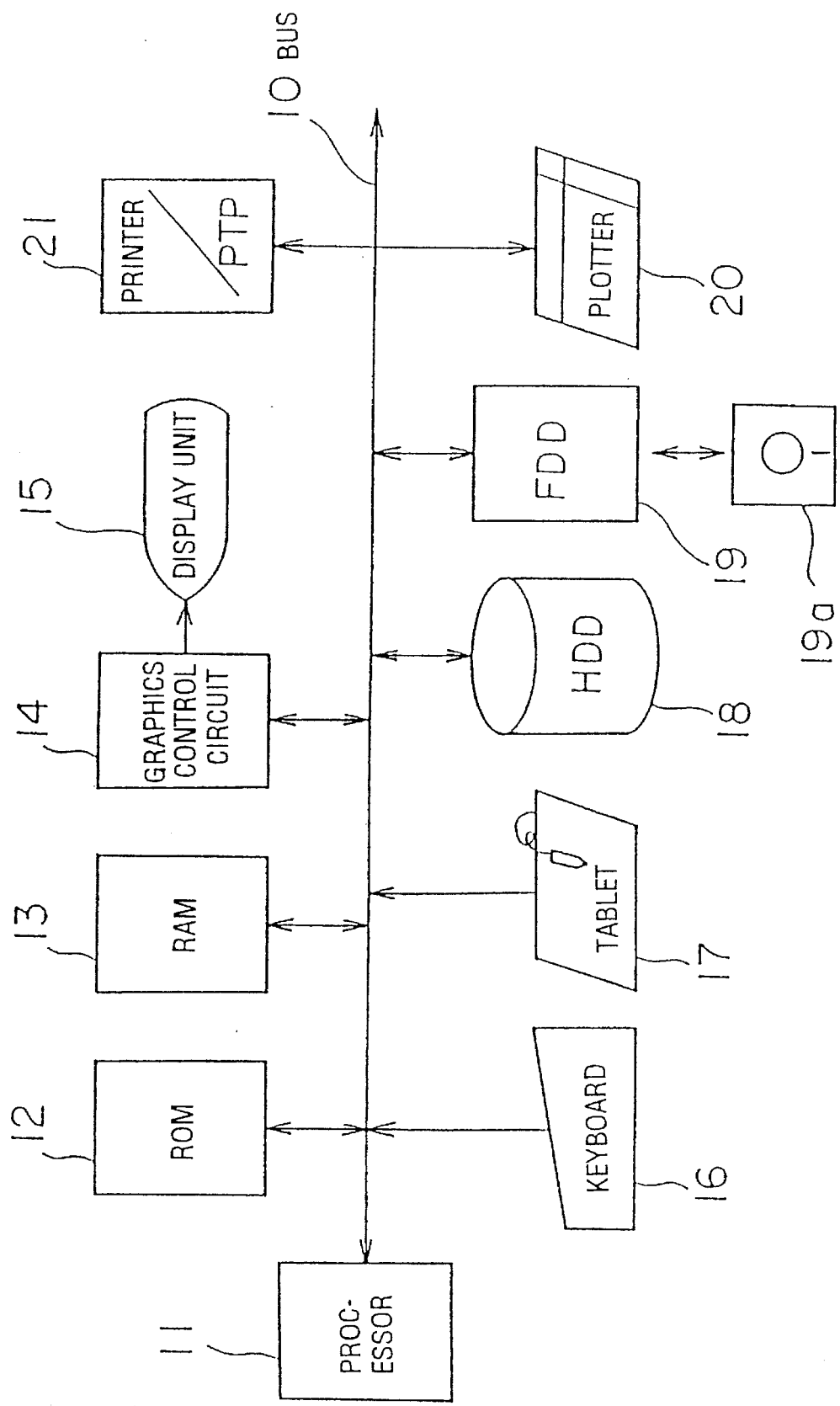
FIG. 7 is a block diagram showing a hardware for an automatic programming system in a specific embodiment of the present invention.
Figure 8:
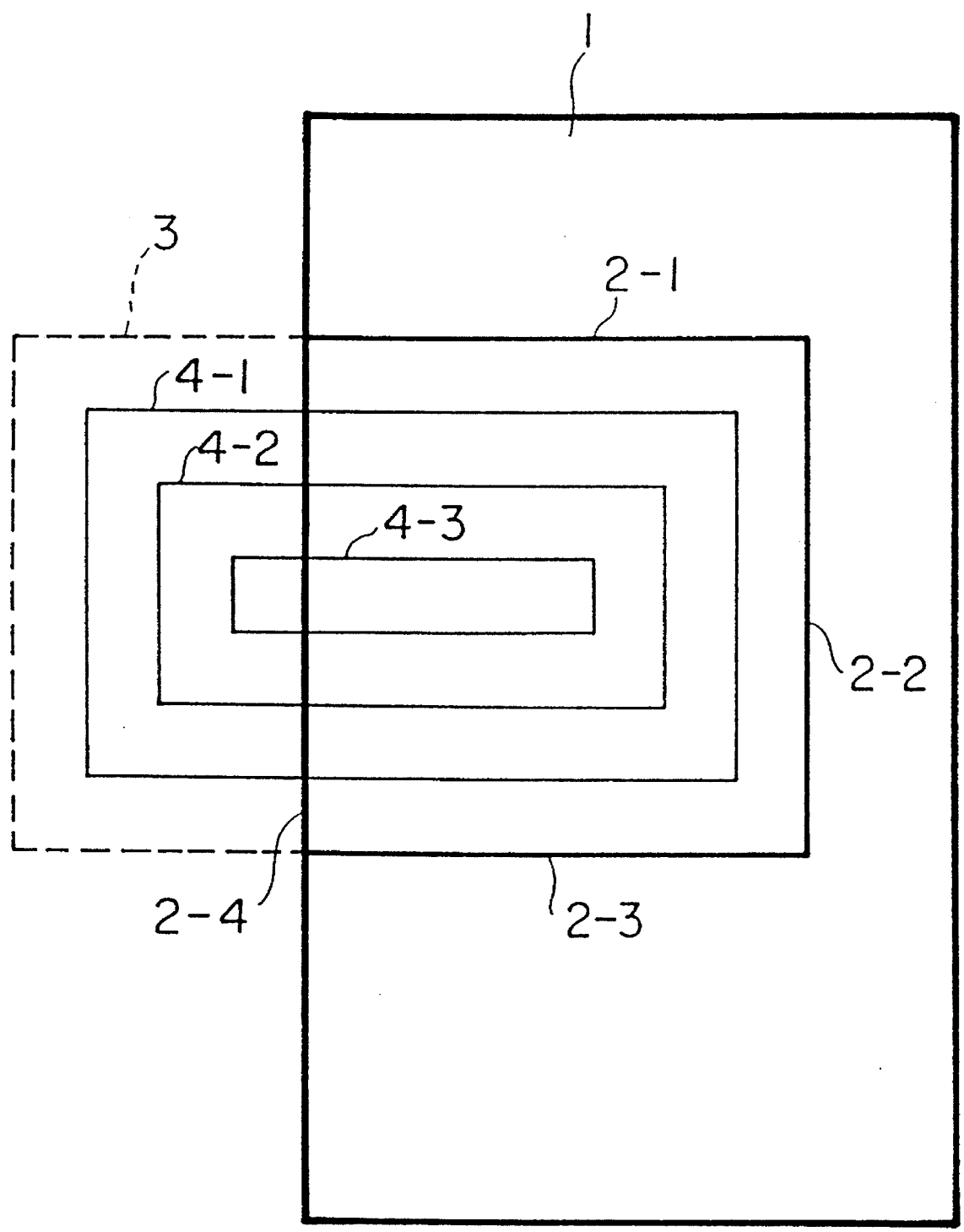
FIG. 8 is a diagram of a conventional area machining method for hollowing out a partially open area.
Figure 9:
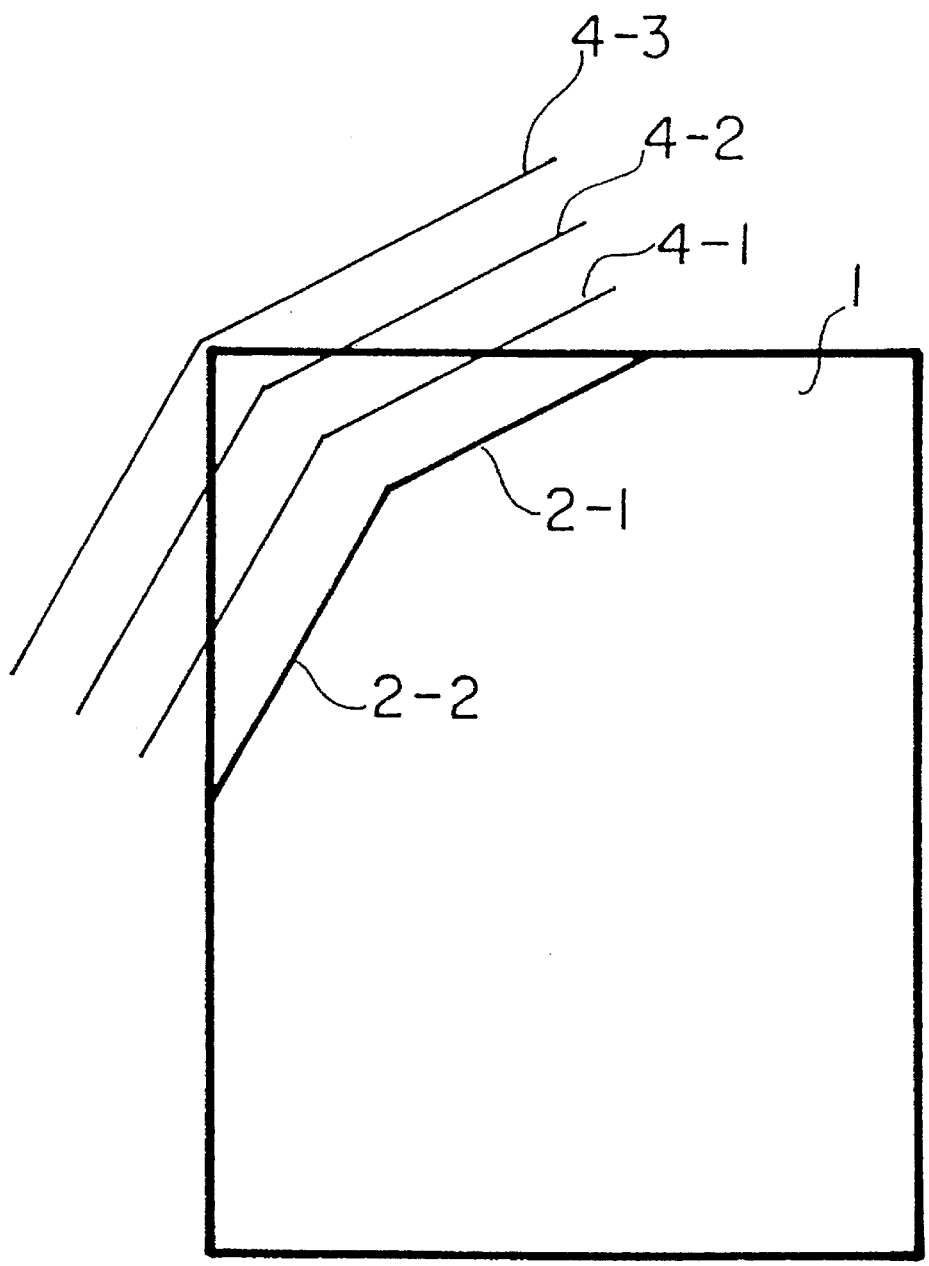
FIG. 9 is a diagram of another example of a conventional machining method for hollowing out a partially open area.

FIG. 7 is a block diagram showing a hardware of an automatic programming system in a specific embodiment of the present invention. In FIG. 7, the automatic programming system comprises a processor 11, a read-only memory (ROM) 12, a main memory (RAM) 13, a graphics control circuit 14, a display unit 15, a keyboard 16, a tablet 17, a hard disk drive (HDD) 18, a floppy disk drive (FDD) 19, a plotter 20, and a printer/paper tape puncher unit (PTP) 21. Those system elements are connected to each other via a bus 10.

The processor 11 totally supervises the automatic programming system according to a system program stored in the ROM 12. The main memory 13 stores various data for area machining such as a final part contour, cutting conditions, an offset contour table created in the middle of data processing, and a generated part program.

The graphics control circuit 14 converts display data from the processor 11 into a display signal and sends it to the display unit 15. The display unit 15 receives the display signal and displays it on the screen. A CRT (Cathode Ray Tube) or liquid crystal display is used for the display unit 15.

The keyboard 16 has function keys and other various keys for operations. The tablet 17 is used for entering shape data.

The hard disk drive 18 saves data, such as generated part programs, which must be retained even if the power is shut off. The floppy disk drive 19 drives a floppy disk 19a for saving the part programs which were generated or edited and also for reading them out again.

In addition, the automatic programming system can output the part programs to the plotter 20 or the printer/paper tape puncher 21.

As described above, according to the present invention, an outward offset line is defined at first so that it will be set away from the workpiece contour with a predetermined offset distance, and then offset contours are obtained within an area surrounded by the final part contour and the outward offset line. Therefore, the tool path created from a combination of the offset contours will be all valid for the machining. That is, it contains no meaningless tool motions such as cutting air in vain, thus providing efficiency. In addition, the method of the present invention can automatically determine the cutting start position so that the tool will start its motion from the outside of the workpiece.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An area machining method for hollowing out an area whose boundary is partially open, comprising the steps of:

defining a shape and cutting conditions of an area to be machined, wherein the shape of the area is defined by a workpiece contour, which is a part of a workpiece outline, and a final part contour, which is a finished contour expected to be obtained as a result of the area machining;

defining an outward offset line that is set away from the workpiece contour with a predetermined offset distance;

generating a series of offset contours, being defined within a region between the final part contour and the outward offset line, each of which has a predetermined offset distance only from the final part contour;

generating a tool path by connecting the offset contours; and setting a tool speed to each part of the tool path so that a cutting feedrate should be set to the offset contours except for a common segment with the outward offset line and a rapid traverse speed or a predetermined speed should be set to the outward offset line.

2. The area machining method according to claim 1, wherein the workpiece contour is specified, in the step of defining the shape of the area and the cutting conditions, by pointing elements of the workpiece contour out of line elements displayed on a screen.

3. The area machining method according to claim 1, wherein the workpiece contour is specified, in the step of defining the shape of the area and the cutting conditions, by adding a keyword to indicate an element of the workpiece contour to area definition statements to be inputted to an automatic programming system.

4. A method of determining a cutting start position in an area machining for hollowing out an area whose boundary is partially open, comprising the steps of:

extracting a last offset contour from an offset contour table, wherein the offset contour table contains a series of offset contours, which indicate tool paths being set away from a final part contour by a series of offset distances, and the last offset contour has a last numerical order and located farthest from the final part contour among the series of the offset contours in the offset contour table;

extracting a starting element out of elements forming the last offset contour, wherein the starting element has a workpiece-contour property; and determining either an initial point or a terminal point of the starting element as the cutting start position.

* * * * *